Dec. 27, 1932.  T. G. NYBORG  1,891,945
SHAKER CONVEYER ENGINE
Filed May 16, 1928  3 Sheets-Sheet 1

Inventor
TAGE GEORG NYBORG,
BY
Toulmin & Toulmin
Attorneys

Dec. 27, 1932.  T. G. NYBORG  1,891,945
SHAKER CONVEYER ENGINE
Filed May 16, 1928  3 Sheets-Sheet 2

Inventor
TAGE GEORG NYBORG,
BY Toulmin + Toulmin
Attorneys

Dec. 27, 1932.   T. G. NYBORG   1,891,945
SHAKER CONVEYER ENGINE
Filed May 16, 1928   3 Sheets-Sheet 3
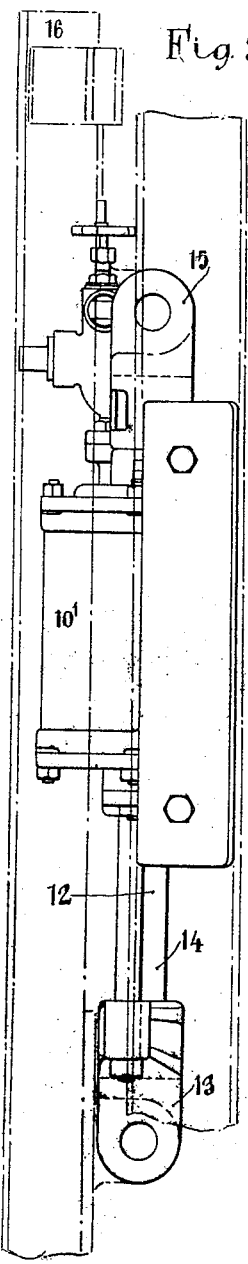
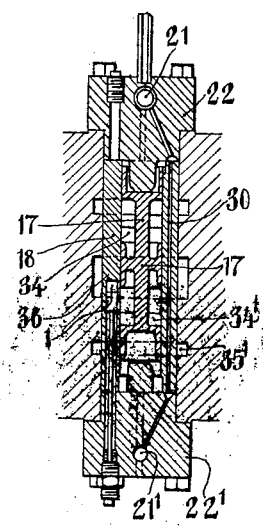
Inventor
TAGE GEORG NYBORG,
By Toulmin & Toulmin
Attorneys Patented Dec. 27, 1932

1,891,945

UNITED STATES PATENT OFFICE

TAGE GEORG NYBORG, OF WORCESTER, ENGLAND, ASSIGNOR OF ONE-HALF TO MARK FREDERICK HIGGINS, OF WORCESTER, WORCESTERSHIRE, ENGLAND

SHAKER CONVEYER ENGINE

Application filed May 16, 1928, Serial No. 278,065, and in Great Britain October 4, 1927.

This invention relates to shaker conveyer engine, and more particularly to shaker conveyer engine for use in confined spaces, where in very thin seams it is difficult to arrange the engine operating the trough so that the same engine can be used under all conditions without alterations or adding extra parts.

The object of the present invention is to provide an engine which will be suitable for all conditions met with in very thin seams.

Broadly, the present invention consists in providing a double cylinder engine (one cylinder on each side of the trough to allow the trough to be as low as possible). The piston rods in the two cylinders may actuate on a common guide or pulley rod, strong enough to withstand all stress put on it from the trough. Both cylinders may be controlled by one piston-valve operated by admitting live air to one or the other end by two smaller piston-valves. These piston valves may be operated from the draw-bar by a connection in such a way that the point of reversal can easily be adjusted for either end of the stroke.

To reverse the direction of delivery it need only be necessary to take the sleeve for the main control valve out and re-insert it in the opposite direction. The engine may be of the double action type by which the pressure on the one side of the piston can be reduced to suit the conditions or gradient of the trough.

A shaker conveyer engine made according to the present invention is illustrated by way of example in the accompanying drawings wherein:—

Figure 1:
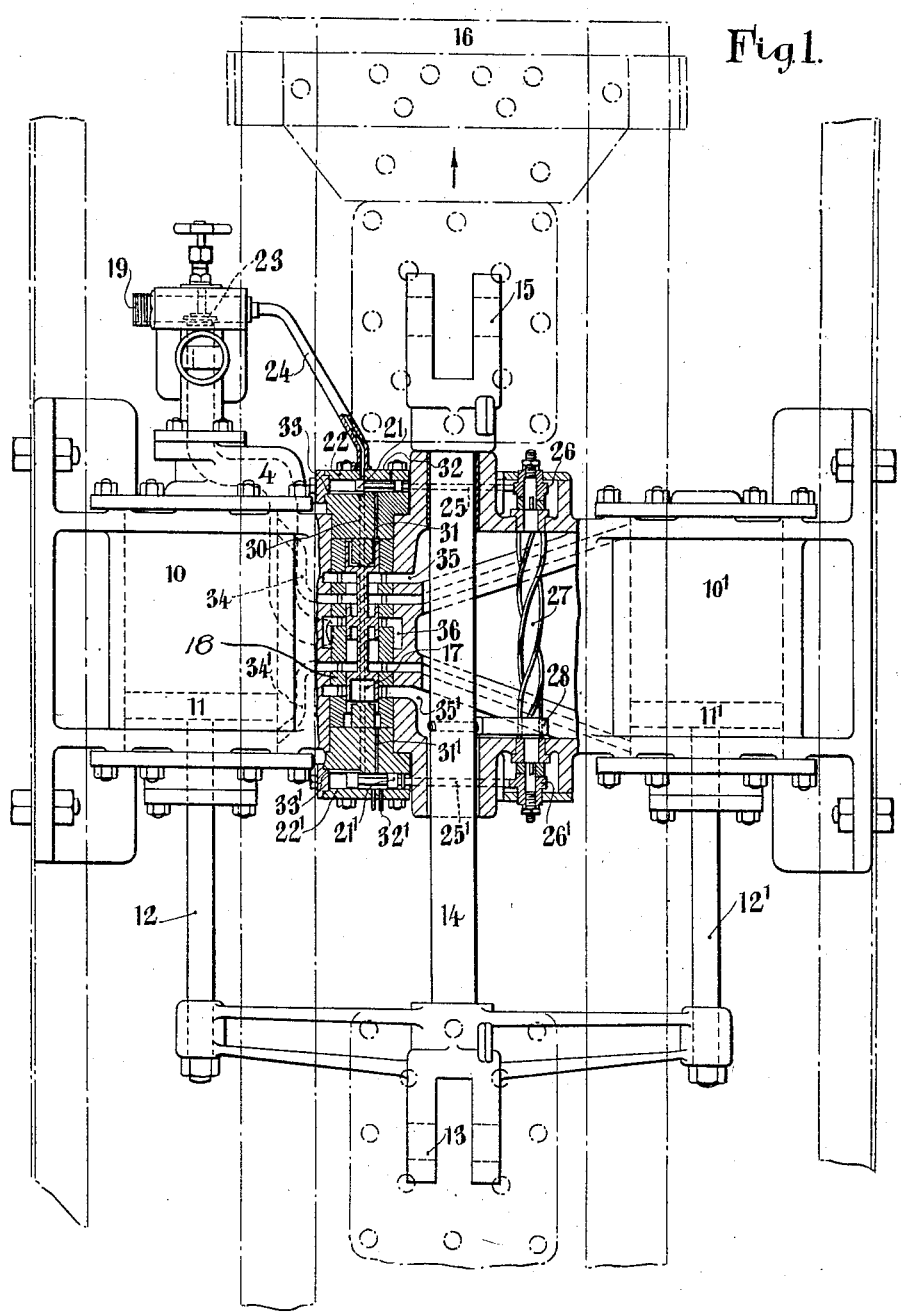
Figure 5:
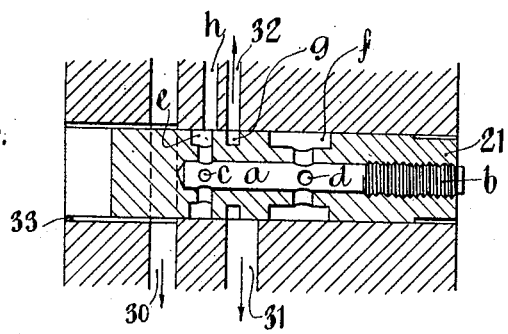
Figure 6:
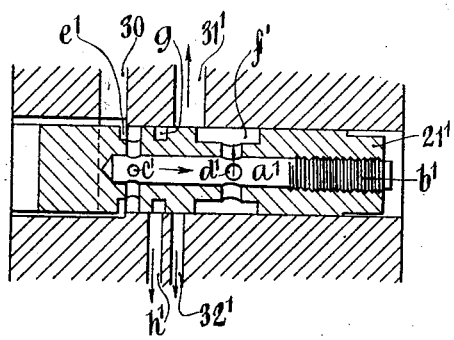
Figure 2:
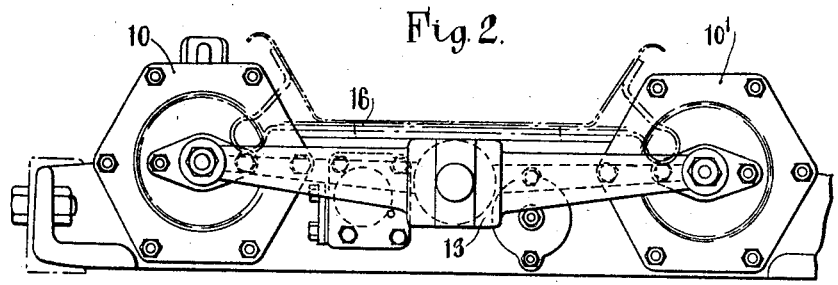

Fig. 1 is a plan view, partly in section;
Fig. 2 is an end view;
Fig. 3 is a side view;
Fig. 4 is a vertical section through the main piston valve, and
Figs. 5 and 6 are detail views of the two control valves.

Referring to the drawings,

In the cylinders 10, 10' arranged parallel to each other reciprocate pistons 11, 11', the piston rods 12, 12' of which are secured to a crosshead jaw 13 fixed to the drawbar 14. Another crosshead jaw 15, is secured to the other end of the drawbar 14, both the jaws 13 and 15 being utilized for connecting the trough 16 to the engine, so that the trough 16 can be disposed very low to the ground. The main control valve 17 is disposed between the two cylinders and is located in a cylinder formed by the sleeve 18 which also houses an adjustable throttle valve 1. The main pipe line is connected to the union 19, and the air supply to the main piston control valve is admitted through the pipe 4. Live air is also admitted, at the same pressure as in the main pipe line, to the small control valves 21, 21' working in cylinders 22, 22' formed by the end covers for the main piston control valve 17. This air is admitted through the hand operated stop valve 23 and pipe 24 in the way hereinafter described. The control valves 21, 21' are operated to move to the left in Fig. 1 by press rods 25, 25', actuated by cams 26, 26' on the spiral fluted shaft 27, which is adapted to be rotated by nut 28 fixed to the drawbar and reciprocating therewith. The cams 26, 26' can be fixed in any position in respect to the shaft 27, so that reversal of the pistons can be set at will.

The control valves 21, 21' (Figs. 5 and 6) each consist of piston-like members in which passages $a$, $a'$ are formed by borings, the passages being closed at the free ends by threaded plugs $b$ $b'$. These passages $a$ $a'$ communicate with the outside by holes $c$, $d$, $c'$, $d'$ drilled in the walls of the pistons in line with inlet ports $e$, $e'$ and outlet ports $f$, $f'$ formed by reducing the diameter of the pistons. Exhaust ports $g$ $g'$ are provided to coact with exhaust passages 32, 32'. In addition to the exhaust passages 32, 32' provision is made for exhausting any leakage that might occur in the valves themselves through exhaust ports $h$, $h'$.

Communication between the two valves 21, 21' is adapted to be established via a passage 30 disposed in the valve sleeve 18, and between the valves 21, 21' and the main piston valve 17 by passages 31, 31'.

The passages 33, 33' admit live air to the back of the piston valves 21, 21', so that the air pressure always tends to push the valves 21, 21' to the right in Fig. 1. 34, 34' are admission ports to the cylinder and 35, 35' are the exhaust ports.

The main air supply is admitted by the pipe 4, into annular chamber 36, the amount supplied to the return end of the cylinders 10, 10' being regulated by the throttle valve 1.

The operation is as follows, assuming the delivery to be in the direction of the arrow, Fig. 1, and the control valves 21, 21' to be in the position shown in Figs. 1, 5 and 6. Air is admitted from stop valve 23 into pipe 24, whence it passes into the passage 30, and thence through inlets e' c', through the passage a' into the valve 21', out through port f', into passage 31', and so to the bottom end of the main piston valve 17. The piston valve 17 is pushed forward by the incoming air, uncovering the exhaust ports 34 and 35 and opening the inlet port 34' through which air from the main air supply chamber 36 passes to the underside of the pistons 11, 11'. This air supply and consequently the speed of the pistons is regulated by the throttle valve 1.

As soon as the piston 11 moves forward the nut 28 moves forward also and thereby turns the spindle 27 so that the valves 21' and 21 are actuated to move in one direction by fluid pressure, and to move in the opposite direction by the cams 26, 26', whereby the air supply through the passage 30 is cut off and the air at the bottom end of the main piston valve is allowed to exhaust through the exhaust port 32'.

At this time the forward motion of the piston 11 and the nut 28 has turned the spindle 27 and consequently the cam 26, so that the latter operates the valve 21 thereby admitting live air from the front of the stop valve 23 through the pipe 24 and the passage 31 to the top end of the main piston valve 17, whereby the bottom ends of the cylinders 10, 10' are opened to exhaust through the ports 34' and 35' and the main supply of live air from the stop valve 23 enters the front end of cylinders through pipe 4, chamber 36 and pipe 34 and thereby forces the pistons in the opposite direction and so on.

It is impossible to make the valves 21, 21' an absolutely exact fit in the chambers 22, 22' and it is found in practice that there is a slight leakage which is not identical for both valves, so that the air admitted to the top of the main valve 17 is not exactly equal to the quantity admitted to the bottom of the valve or vice versa. In order to avoid this the separate exhausts h, h' are provided for exhausting any leakage from the air supply.

The connection between engine and trough can either be by the usual connecting rod or by a special short trough provided with lugs fitted into the jaws on the drawbar; or in any other way.

What I claim and desire to secure by Letters Patent is:—

1. In a shaker conveyer engine comprising two cylinders in spaced relationship, one on either side of the centre of the conveyer, a piston slidable in each cylinder and a piston rod to each piston, a rigid yoke connecting the two piston rods together and a drawbar arranged between and parallel to the cylinders and connected at one end to the said yoke.

2. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke and a jaw for connecting purposes at the free ends of the drawbar.

3. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke and a control valve common to both cylinders arranged between the drawbar and one cylinder.

4. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder and two auxiliary valves for actuating the control valve, the auxiliary valves being arranged on the same side of the drawbar as the control valve.

5. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve and a control device for the auxiliary valves, the said control device being arranged on the side of the drawbar remote from the auxiliary valves.

6. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, a control device for the auxiliary valves, the said control device being arranged on the side of the drawbar remote from the auxiliary valves and comprising a fluted shaft, a nut fixed to move with the drawbar and sliding over the fluted shaft, cams fixed to rotate with the fluted shaft and acting on rods, which, in turn, act on the auxiliary valves.

7. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, a control device for the auxiliary valves, the said control device being arranged on the side of the drawbar remote from the auxiliary valves and comprising a fluted shaft, a nut fixed to move with the drawabar and sliding over the fluted shaft, cams fixed to rotate with the fluted shaft, and adjustable thereon so that each one of both points of reversal of the pistons can be easily adjusted, and rods actuated by the cams and which operate in turn the auxiliary valves.

8. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder and means for by-passing a supply of live air from the main air supply to operate the control valve.

9. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, and means for by-passing a supply of live air from the main air supply to the auxiliary valves for operating the control valve.

10. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, a control device for the auxiliary valves, the said control device being arranged on the side of the drawbar remote from the auxiliary valves, and means for by-passing a supply of live air from the main air supply to the two auxiliary valves for operating the control valve.

11. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, a control device for the auxiliary valves, the said control device being arranged on the side of the drawbar remote from the auxiliary valves and comprising a fluted shaft, a nut fixed to move with the drawbar and sliding over the fluted shaft, cams fixed to rotate with the fluted shaft and acting on rods, which, in turn act on the auxiliary valves, and means for by-passing a supply of live air from the main air supply to the two auxiliary valves for operating the control valve.

12. In a shaker conveyer engine comprising two cylinders in spaced relationship, one on either side of the centre of the conveyer, a piston slidable in each cylinder and a piston rod to each piston, a rigid yoke connecting the two piston rods together, a drawbar arranged between and parallel to the cylinders and connected at one end to the said yoke, a control valve common to both cylinders arranged between the drawbar and one cylinder, two auxiliary valves for actuating the control valve, the auxiliary valves being arranged on the same side of the drawbar as the control valve, a control device for the auxiliary valves, the said control device being arranged on the side of the drawbar remote from the auxiliary valves and comprising a fluted shaft, a nut fixed to move with the drawbar and sliding over the fluted shaft, cams fixed to rotate with the fluted shaft, and adjustable thereon so that each one of both points of reversal of the pistons can be easily adjusted, rods actuated by the cams and which operate in turn the auxiliary valves, and means for by-passing a supply of live air from the main air supply to the two auxiliary valves for operating the control valve.

In testimony whereof, I affix my signature.

TAGE GEORG NYBORG.